United States Patent [19]

Kamada et al.

[11] 4,055,696
[45] Oct. 25, 1977

[54] POROUS POLYPROPYLENE HOLLOW FILAMENTS AND METHOD MAKING THE SAME

[75] Inventors: Kensuke Kamada; Shunsuke Minami; Kanji Yoshida, all of Ohtake, Japan

[73] Assignee: Mitsubishi Rayon Co., Ltd., Tokyo, Japan

[21] Appl. No.: 698,929

[22] Filed: June 23, 1976

[30] Foreign Application Priority Data

July 9, 1975 Japan ................................ 50-84718

[51] Int. Cl.² .......................... D02G 3/00; D01D 5/12
[52] U.S. Cl. .................................. 428/398; 428/400; 428/401; 264/210 F
[58] Field of Search ................... 428/398, 400, 401; 264/210 F

[56] References Cited

U.S. PATENT DOCUMENTS 3,558,764 1/1971 Isaacson ........................... 264/210 F
3,630,824 12/1971 Rohlig ................................ 428/398

FOREIGN PATENT DOCUMENTS 1,137,027 12/1968 United Kingdom ................. 264/168

OTHER PUBLICATIONS

"Hollow-Fiber Membranes", *Encyclo. of Poly. Sci. and Tech.,* vol. 15, pp. 258-272.
"Hollow Fiber Use in Water Treatment Expands", *C&EN,* p. 29, 1971 (June 7).

*Primary Examiner*—Ellis Robinson
*Attorney, Agent, or Firm*—Oblon, Fisher, Spivak, McClelland & Maier

[57] ABSTRACT

There are disclosed porous polypropylene hollow filaments which have a surrounding wall portion of less than 60 μ, preferably 40 μ in thickness which contains many fine holes communicating with each other, distribution curve of radius of said fine holes having at least one maximum points within the range of 200–1200 A. The method for producing said porous polypropylene hollow filaments is also disclosed.

2 Claims, 2 Drawing Figures

4,055,696

POROUS POLYPROPYLENE HOLLOW FILAMENTS AND METHOD MAKING THE SAME

BACKGROUND OF THE INVENTION

The present invention relates to porous hollow polypropylene filaments and a method of making the same.

U.S. Pat. No. 3,558,764 discloses a method for producing a porous film by stretching a film comprising polypropylene and other crystalline high polymers to produce pores in the film. According to this method, the porous polypropylene film obtained has pores of 1000–2000 A in average diameter which communicate with each other. Therefore, this film can be effectively used as a gas separating film, ultrafilter, reverse osmosis membrane support, etc.

However, when the porous polypropylene film obtained by said method is used, e.g., as the ultrafilter (2400 W film manufactured by Celanese Corp.), the permeation rate of water is about 0.02–0.03 g/cm².min.atm and thus such film is lower than the conventional cellulose acetate ultrafilter in flux (gallon of water which permeates the film area of 1 feet square per 1 day) and there is the problem in the cost in treating water in an industrial scale. However, when such film of the low flux is made into hollow filaments, film area per volume of apparatus can be markedly increased and amount of water which can be treated per unit volume of the apparatus is increased. Thus, it becomes economically possible to carry out the treatment of water in the industrial scale.

SUMMARY OF THE INVENTION

The object of the present invention is to provide porous polypropylene hollow filaments effective as ultrafilter, reverse osmosis membrane support, gas separating membrane, etc. and a method of making the same.

That is, the porous polypropylene hollow filaments of the present invention are characterized in that the thickness of the surrounding wall portion is less than 60 $\mu$, preferably 40 $\mu$, a number of fine pores communicating with each other are present in said surrounding wall portion and distribution curve of radius of said fine pores has at least one maximum points in the range of 200–1200 A. Furthermore, the method of making said filaments is characterized by melt spinning polypropylene by a nozzle for production of hollow filaments at a spinning temperature of 210°–270° C and a draft of 180–600, then subjecting the resultant filaments to a first heat treatment at a temperature of not higher than 160° C, thereafter stretching them by 30–200% at a temperature lower than 110° C and then subjecting them to a second heat treatment at a temperature not lower than the temperature of the first heat treatment and not higher than 175° C.

BRIEF DESCRIPTION OF THE DRAWING

In FIG. 1, 1 and 2 indicate cocks used for pumping gas or water into the apparatus, 3 and 3' indicate bolts, 4 a rubber packing, 5 the hollow filament, 6 the portion of the hollow filament 5 which is fixed with adhesive, 7 stirrer, 8 a motor and 9 a pressure kettle.

DESCRIPTION OF THE INVENTION AND THE PREFERRED EMBODIMENTS

The invention will be explained in detail.

The thickness of the surrounding wall portion of the present hollow filaments must be less than 60 $\mu$ preferably less than 40 $\mu$ and when it is more than 60 $\mu$, the permeating velocity of water or gas which is pressurized from outside the hollow filaments and permeates from the inside of the hollow filaments is extremely low and they cannot be used as a practical semipermeable membrane. In case the present hollow filaments are used as the ultrafilter or reverse osmosis membrane support, the outer diameter D of the filaments is preferably as small as possible in view of surface area of the film and pressure resistance while the inner diameter $d$ of the hollow filaments is preferably as great as possible from the point of the hydrodynamic resistance in the operation of taking out the permeated liquid from the hollow part. In the present invention, D and $d$ are not specifically limited and may be suitably chosen depending on the use of the hollow filaments. Generally, $d$ is preferably more than 20 $\mu$ and D is preferably less than 400 $\mu$.

Figure 2:
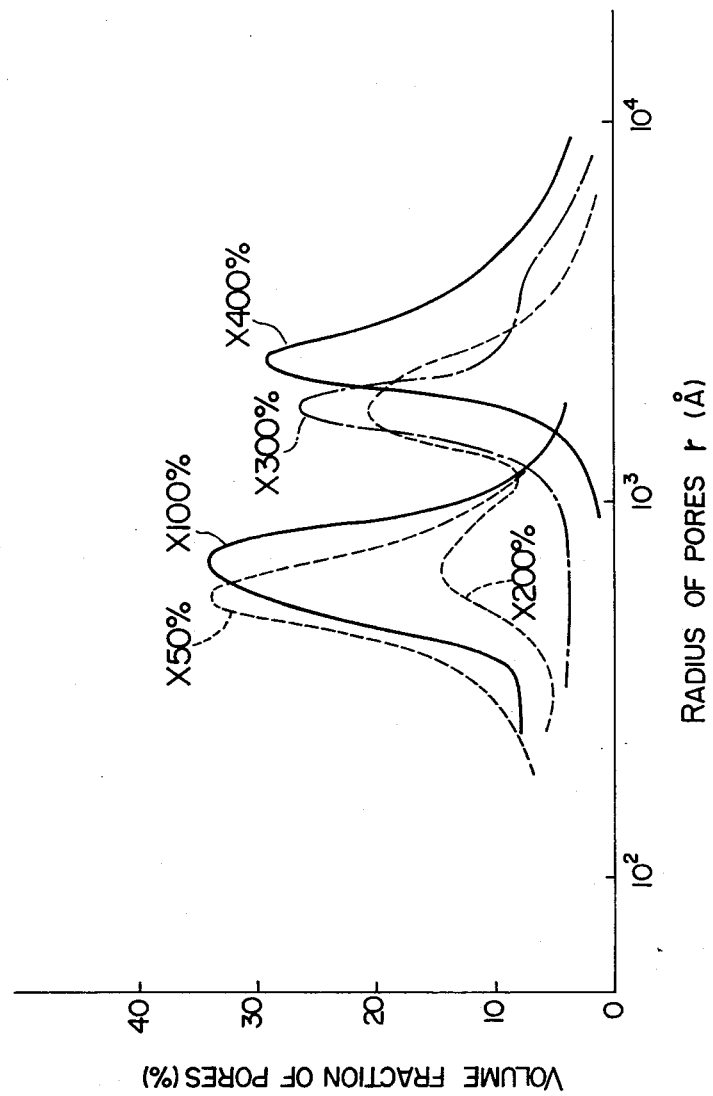
FIG. 2 is a graph which shows the distribution curves of the radius of the pores of the hollow filaments obtained in Example 1 hereinafter given, said radius being measured by Mercury Pressure Porosimeter.

The wall of the hollow filaments contains fine pores, which must communicate with each other to be effective for permeation of gases or fluids. The size of the pores and the distribution of the size can be measured generally by mercury porosymmetry. Assuming the section of the pores to be circular, distribution curves of radius of the pores can be obtained by said measurement. It is necessary that the distribution curve has at least one maximum points between 200–1200 A. That is, as shown in FIG. 2, the porous polypropylene hollow filaments obtained by stretching by 50%, 100 % and 200 % have maximum points at 560 A, 720 A and 670 A in the distribution curves of pore radius, respectively and these filaments have high permeability to $N_2$ gas as shown in Example 1. On the other hand, the porous polypropylene hollow filaments obtained by stretching by 300% and 400% have the maximum points at 1800 and 2400 A, respectively and are extremely low in permeating velocity of gas. Generally, gas permeability of polypropylene films containing no pores is $10^{-11}$–$10^{-10}$ [cc(STP).cm/cm², sec, cm Hg] while that of the present porous hollow filaments is the order of $10^{-6}$. Such high permeating velocity can be obtained because of the many communicating fine pores present in the surrounding wall of the hollow filaments. The gas permeability of the porous hollow filaments of the present invention is different from that of the porous film obtained in said U.S. Pat. No. 3,558,764 in the following point. That is, the film of said U.S. Patent has higher permeability to oxygen gas than to nitrogen gas while the hollow filaments of the present invention have higher permeability to nitrogen gas than to oxygen gas as shown in Example 3. Therefore, the porous structure of the porous polypropylene filaments of the present invention is considered to be considerably different from that of the film of the said U.S. Patent.

The method of producing the hollow filaments of the present invention will be explained below.

Effective porous hollow filaments cannot be obtained by application of the technique of said U.S. Patent which concerns with the film. In order to obtain effective porous hollow filaments, unstretched hollow filaments must be produced by spinning under suitable conditions. In the case of said U.S. Patent, unstretched film for obtaining the porous polypropylene film is preferably produced by melt extrusion at a temperature higher than the melting point by 10°–40° C and taking up the film at a take up ratio (namely, draft) of 20–180. On the other hand, in the present invention the spinning temperature must be set at the range of 210°–270° C, which exceeds the melting point of polypropylene by at least 40° C, that is, the melt spinning is carried out at a temperature outside the optimum extrusion temperature of the film. In addition, the unstretched hollow filaments of the present invention must be taken up at a draft of 180–600 which is much greater than in the case of the film.

The polypropylene used for production of the hollow filaments is the ordinary polypropylene for production of the ordinary fibers. The hollow filaments can be easily produced by extruding the polypropylene from the known nozzle for production of the hollow filaments such as the bridge type nozzle. In this case the spinning temperature is 210°–270° C, preferably 210°–250° C and the spinning draft which is expressed by the ratio of the take up velocity of the unstretched filaments and the linear velocity of extrusion of the polymer from nozzle is 180–600, preferably 200–500. The thickness of the wall of the unstretched hollow filaments must be not more than 70 $\mu$ so that it can be less than 60 $\mu$ by the stretching of 30–200 %. The thickness of the wall can be easily varied by the size of the nozzle or the spinning draft. Thus obtained unstretched hollow filaments are then subjected to the first heat treatment. The first heat treating temperature is not more than 160° C, preferably 100°–155° C. Especially, when the spinning temperature is high, the first heat treatment is carried out preferably at high temperature. The atmosphere for the first heat treatment is preferably dry heat state. The heat treating time is at least 3 seconds. In the case of continuous process, the heat treatment is carried out on dry heated rollers or by passing the filaments through dry heat atmosphere provided between the rollers. The filaments which have been subjected to the first heat treatment are then stretched to form pores in the wall portion of the hollow filaments. The size and amount of the pores vary depending on the stretching ratio and the temperature. Generally, with increase in the stretching ratio the size of the pores increases and the surface area also increases, but surprisingly permeating velocity of a gas or water does not increase with increase in the size of the pores. That is, a high permeating velocity is obtained only when the radius of the pores has a maximum value within the range of 200–1200 A.

In order to control the size of the pores within said range, the hollow filaments which have been subjected to the first heat treatment must be stretched by 30–200 % at a temperature of less than 110° C, preferably room temperature to 90° C.

After the stretching, the filaments are subjected to the second heat treatment to fix the structure of the pores produced by said stretching. The temperature of this heat treatment is not less than the first heat treating temperature and not high than 175° C. When the temperature is lower than the first heat treating temperature, the pore structure is insufficiently fixed and when it exceeds 175° C, the pores are lost. Furthermore, the second heat treatment is preferably conducted for at least 3 seconds under tension.

By the steps as mentioned above, porous hollow filaments having a high gas permeability can be obtained. In general, water cannot permeate such porous polypropylene as it is unless it is allowed to contact with high pressure water because of hydrophobic property of polypropylene. Therefore, when it is used as an ultrafilter the polypropylene must be rendered hydrophilic because the ultrafilter is operated under a low pressure. For making the polypropylene hydrophilic there are two methods, i.e., pre-treatment and after-treatment. In the case of the pre-treatment the polypropylene to be melt extruded is previously made hydrophilic by the known method and in the case of the after-treatment the porous polypropylene hollow filaments are made hydrophilic by a chemical or physical treatment. The method of making polypropylene hydrophilic by grafting acrylic acid or maleic anhydride thereto can be applied both the pre-treatment and after-treatment. The method of making hydrophilic with surfactants and the like can be effectively employed as the after-treatment.

The present invention will be explained in more detail by the following Examples.

EXAMPLE 1

Figure 1:
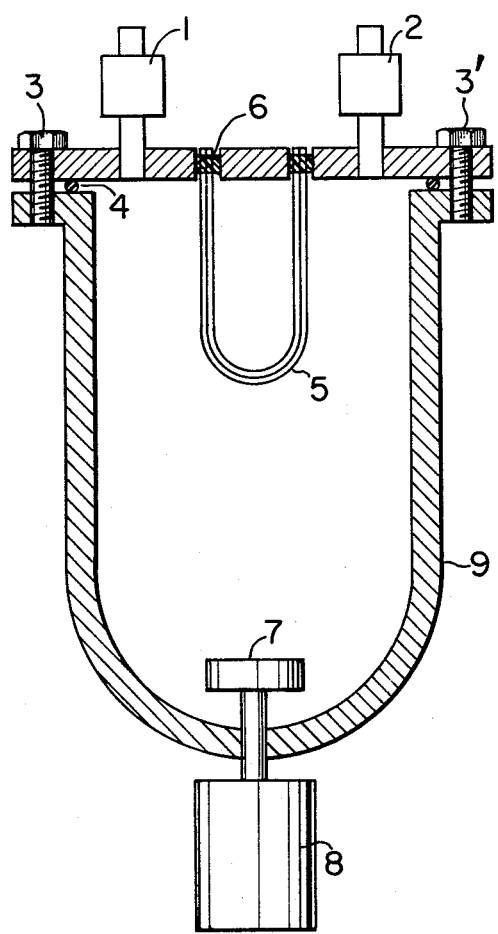
FIG. 1 is a vertical section of the apparatus for measuring gas permeability used in the Examples hereinafter given.

Polypropylene (having $[\eta]$ = 1.40 in tetralin at 135° C) was spun from a nozzle of bridge type having a diameter of 4 mm at a spinning temperature of 230° C, at a take up velocity of 610 m/min and at a draft of 445. Thus obtained unstretched hollow filaments were wound on a metal reel and subjected to the first heat treatment at 140° C for 30 minutes in a hot air box. Then, they were stretched at various stretching ratios of 50, 100, 200, 300 and 400% of the original length at room temperature and were subjected to the second heat treatment at 145° C for 30 minutes in a previously provided hot air drier while maintaining the filaments at the stretched state. Surface area of the thus obtained porous hollow filaments was measured by the gas adsorption method. Furthermore, distribution of the radius of the pores of the hollow filaments different in stretching ratio was obtained by Mercury Pressure Porosimeter manufactured by CARLO ERBA in Italy. The gas permeability of the hollow filaments was measured by pressurizing the hollow filaments from outside with $N_2$ gas of one atom gauge by the apparatus shown in FIG. 1 and measuring the flow amount of the gas permeating from the hollow portion by gas meter. The results are shown in Table 1 and FIG. 2. From these results, it will be recognized that the distribution curves of the pore radius of the hollow filaments of stretching ratio 50–200% have at least one maximum points between 200–1200 A and that the hollow filaments of said stretching ratio have much higher gas permeability than those of the higher stretching ratio.

Table 1

| Stretching ratio (%) | Outer diameter of hollow filaments D($\mu$) | Inner diameter of hollow filaments d($\mu$) | Thickness of surrounding wall of hollow filaments ($\mu$) | Surface area of hollow filaments (m²/g) | Gas* permeability K |
|---|---|---|---|---|---|
| 50  | 100 | 55 | 22.5 | 22.0 | $6.7 \times 10^{-6}$ |
| 100 | 90  | 50 | 20   | 34.5 | 6.5 " |
| 200 | 75  | 35 | 20   | 53.0 | 6.2 " |
| 300 | 70  | 35 | 17.5 | 70.0 | 2.7 " |
| 400 | 65  | 30 | 17.5 | 50.3 | 1.4 " |

Table 1-continued

| Stretching ratio (%) | Outer diameter of hollow filaments D($\mu$) | Inner diameter of hollow filaments d($\mu$) | Thickness of surrounding wall of hollow filaments ($\mu$) | Surface area of hollow filaments (m$^2$/g) | Gas* permeability K |
|---|---|---|---|---|---|
| Unstretched filaments | 110 | 60 | 25 | 0.5 | 0 |

Note:
In the above Table 1 the unit of K is "c.c. cm/cm$^2$, sec, cm Hg" and the area of the gas permeating film was calculated from the outer circumference of the hollow filaments.

EXAMPLE 2

The porous hollow filaments obtained in the Example 1 were surface treated with a surfactant to make them hydrophilic. The outside of these hollow filaments were allowed to contact with water containing 100 ppm of oil under the pressure of one atm. using the apparatus shown in FIG. 1. The flow amount of water permeating from the hollow part of the hollow filaments was measured. Moreover, the oil content in the water which permeated from the filaments was measured from the percent transmission of light. The results are shown in Table 2, from which it will be seen that the filaments stretched by 50–200% had excellent oil removability and water permeability in treatment of oil-containing waste water.

Table 2

| Stretching ratio of hollow filaments used. | Flux of permeating water (gfd)* | Oil content in permeating water |
|---|---|---|
| 50 % | 2.5 | < 1 ppm |
| 100 % | 2.2 | < 1 ppm |
| 200 % | 1.1 | < 1 ppm |
| 300 % | ≈ 0 | — |
| 400 % | ≈ 0 | — |

Note:
In Table 2 the term "gfd" is an abbrevation of "gallon/(feet)$^2$. Day" which means the amount (in gallon) of liquid which permeates the film area of 1 feet square per one day and the film area was calculated from the outer surface of the hollow filaments.

COMPARATIVE EXAMPLE 1

The unstretched hollow filaments obtained in the same manner as in Example 1 except that a take up velocity of 200 m/min and a draft of 90 were employed were subjected to the same first heat treatment as of the Example 1 and then they were stretched by 100% at room temperature and subjected to the second heat treatment at 145° C. The distribution curve of the pore radius of thus obtained porous polypropylene hollow filaments had a maximum value at 1100 A and the filaments had an outer surface area of 15 m$^2$/g. Furthermore, the stretched hollow filaments had an outer diameter of 230 $\mu$, an inner diameter of 90 $\mu$ and a thickness of the surrounding wall of 70 $\mu$. The N$_2$ gas permeability of the porous hollow filaments was examined in the same manner as in Example 1. The gas permeability K was less than 10$^{-6}$ and substantially no permeation occurred.

EXAMPLE 3

Permeating velocity of He gas and O$_2$ gas in the porous hollow filaments having a stretching ratio of 100% which were obtained in Example 1 was measured in the same manner as in Example 1. The results are shown in Table 3. It will be seen from the Table 3 that the permeation velocity decreased in the sequence of He, N$_2$ and O$_2$ gases.

Table 3

| Test gas | K (cc.cm/cm$^2$, sec, cm Hg) |
|---|---|
| He | 7.65 × 10$^{-6}$ |
| O$_2$ | 5.60 × 10$^{-6}$ |
| N$_2$ (Example 1) | 6.50 × 10$^{-6}$ |

EXAMPLE 4

Unstretched hollow filaments were obtained from the same polypropylene as of the Example 1 with various spinning temperatures. Thus obtained hollow filaments were wound on a metal reel and subjected to the first heat treatment at 150° C for 30 minutes in a hotair box. Then, they were stretched by 100% at room temperature and thereafter subjected to the second heat treatment at 150° C for 30 minutes in a hot air box while maintaining the stretched length. The N$_2$ gas permeability of thus obtained porous polypropylene hollow filaments was measured in the same manner as in Example 1. The results are shown in Table 4. It will be seen from the Table 4 that no effective hollow filaments could be obtained when the spinning temperature exceeded 270° C.

Table 4

| Spinning temperature (° C) | Draft | Gas permeability K of 100 % stretched filaments |
|---|---|---|
| 220 | 455 | 6.0 × 10$^{-6}$ |
| 250 | 455 | 5.1 × 10$^{-6}$ |
| 270 | 455 | 4.0 × 10$^{-6}$ |
| 280 | 455 | < 1 × 10$^{-6}$ |

EXAMPLE 5

Unstretched hollow filaments differing in draft were produced from the same polypropylene as in the Example 1 at a spinning temperature of 230° C changing the size of the nozzle, the take up velocity and the extrusion amount of the polymer. These hollow filaments were subjected to the first heat treatment, the stretching and the second heat treatment in the same manner as in Example 1 to obtain porous polypropylene hollow filaments. The stretching ratio was all 100%. The gas permeability of the hollow filaments thus obtained was measured in the same manner as in Example 1 to obtain the results as shown in Table 5. It will be seen from Table 5 that effective porous hollow filaments cannot be obtained from the unstretched filaments of small draft.

Table 5

| Draft | Outer diameter of 100 % stretched filaments ($\mu$) | Inner diameter of 100 % stretched filaments ($\mu$) | Gas permeability K |
|---|---|---|---|
| 197 | 85 | 20 | 4.3 × 10$^{-6}$ |
| 130 | 150 | 80 | < 1 × 10$^{-6}$ |
| 49.4 | 175 | 50 | < 1 × 10$^{-6}$ |

EXAMPLE 6

The unstretched hollow filaments obtained in Example 1 were subjected to the first heat treatment at 140° C for 30 minutes, stretched by 100% at various temperatures and then subjected to the second heat treatment for 30 minutes in a box of 145° C. The outer surface area and the gas permeability of thus obtained porous hollow filaments were measured in the same manner as in Example 1 to obtain the results as shown in Table 6. It will be seen from the results that effective porous hollow filaments cannot be obtained when the stretching temperature exceeded 110° C.

Table 6

| Stretching temperature (° C) | Outer surface area of stretched filaments (m²/g) | gas permeability K of stretched filaments |
|---|---|---|
| 50 | 35.0 | $6.1 \times 10^{-6}$ |
| 70 | 34.1 | $6.0 \times 10^{-6}$ |
| 90 | 38.5 | $5.2 \times 10^{-6}$ |
| 100 | 14.6 | $3.5 \times 10^{-6}$ |
| 110 | 5.6 | $< 10^{-6}$ |

What is claimed is:

1. Porous polypropylene hollow filaments consisting essentially of polypropylene, wherein;
   the thickness of the surrounding wall portion is less than 60 $\mu$;
   many fine interconnecting holes are present in said surrounding wall portion;
   the distribution curve of the radius of said fine holes has at least one maximum point within the range of 200–1200 A;
   said porous polypropylene filaments being more permeable to nitrogen gas than to oxygen gas and;
   wherein said porous polypropylene hollow filaments have been prepared by stretching hollow polypropylene filaments from 30 to 200%.
2. Porous polypropylene hollow filaments according to claim 1, which have an outer diameter of less than 400 $\mu$ and an inner diameter of more than 20 $\mu$.

* * * * *